(12) United States Patent
Kaeriyama

(10) Patent No.: US 6,618,186 B2
(45) Date of Patent: Sep. 9, 2003

(54) MICRO-ELECTROMECHANICAL SYSTEM

(75) Inventor: Toshiyuki Kaeriyama, Tsukuba-gun (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/028,024

(22) Filed: Dec. 21, 2001

(65) Prior Publication Data

US 2002/0109903 A1 Aug. 15, 2002

(30) Foreign Application Priority Data

Dec. 21, 2000 (JP) ........................................ 2000-388179

(51) Int. Cl.⁷ .............................................. G02B 26/00
(52) U.S. Cl. ........................ 359/292; 359/291; 359/295
(58) Field of Search ................... 359/291, 292, 359/295

(56) References Cited

U.S. PATENT DOCUMENTS 6,071,616 A    6/2000   Sulzbach et al.
6,282,010 B1   8/2001   Sulzbach et al.

Primary Examiner—David N. Spector
Assistant Examiner—Jack Dinh
(74) Attorney, Agent, or Firm—Charles A. Brill; Wade James Brady, III; Frederick J. Telecky, Jr.

(57) ABSTRACT

To suppress undesired scattered light and leaking light so as to improve the optical function and reliability. In this DMD, as the address circuit of one cell, SRAM 12 is formed monolithically on the principal surface of silicon substrate 10, and, on said SRAM 12, reflective digital optical switch or optical modulating element 16 is formed monolithically as one cell made of three layers of a metal, such as aluminum, via oxide film 14. Each reflective optical modulating element 16 has bias bus 18 and yoke address electrodes 20, 22 as the first metal layer, torsional hinge 24, hinge supporting portions 26, 28, yoke 30, and mirror address electrodes 32, 34 as the second metal layer, and mirror 36 as the third metal layer. Optical absorptive and nonconductive film 40 is formed to cover a portion or all of the first metal layer and to cover underlying film (insulating film) 14. In addition, said film 40 is formed to bury hole formed on the surface of the third metal layer.

21 Claims, 10 Drawing Sheets

MICRO-ELECTROMECHANICAL SYSTEM

This application claims priority under 35 USC §119 of Japanese application number 2000-388179 filed Dec. 21, 2000.

FIELD OF THE INVENTION

This invention pertains to a type of micro-electromechanical system. In particular, this invention pertains to a type of device or system which is required to have optical quality or reliability.

BACKGROUND OF THE INVENTION

A micro-electromechanical system (MEMS) is usually a system that has electrically controllable micromachines (such as a motor, gear, optical modulating element, etc.) formed monolithically on a semiconductor substrate by means of photoetching or another wafer process.

A DMD (Digital Micromirror Device), a type of MEMS, is a reflective type optical modulator with electrical/mechanical/optical functions assembled on a single substrate. For example, plural (usually a fraction of a million or more) movable mirrors in a prescribed size (such as 16 $\mu$m square) are set in matrix constitution with a prescribed pitch (say, 17 $\mu$m) on a silicon substrate, and each movable mirror is set in one of two directions preset corresponding to the output of the corresponding address circuit.

In prior art, for a DMD for image display, improvement of the contrast ratio, that is, the contrast ratio of full ON (ON for all pixels)/full OFF (OFF for all pixels), is a topic to be addressed. In home entertainment, digital cinema, and other applications which require high image quality, a contrast ratio similar to that of a CRT (about 1000:1) is desired, yet the contrast ratio of a conventional DMD is at most about 500:1.

The contrast ratio of a DMD depends on the ratio of the light intensity from ON pixels to that from OFF pixels. Light leaking from OFF pixels becomes the principal factor in limiting the contrast ratio. This type of leaked light is mainly due to light that enters the mirror gap, is reflected by the lower structure and leaks from mirror gap and as well as light scattered and diffracted from supporting holes that support mirrors on yokes.

The objective of this invention is to solve the aforementioned problems of conventional methods by providing a type of micro-electromechanical system which can suppress undesired scattered and leaking light so as to have improved optical function and reliability.

Another objective of this invention is to provide a type of micro-electromechanical system which can reduce or prevent light reflection from the lower structure and upper structure of the movable portion so as to improve the optical function and reliability.

Yet another objective of this invention is to provide a type of micro-electromechanical system for image display with significantly improved contrast ratio.

SUMMARY OF THE INVENTION

In order to realize the aforementioned objectives, this invention provides a type of micro-electromechanical system characterized by the fact that in a micro-electromechanical system, which has an electrical circuit and a movable portion that can be driven and controlled by said electrical circuit on a substrate, there is an optical absorptive film that covers a portion or all of the members set on said substrate.

For the micro-electromechanical system of this invention, an optical absorptive film is coated on the portion of the substrate that would otherwise become a source of undesired leaking light or scattered light. Consequently, light is absorbed by the film, so that reflection and scattering of light can be alleviated or prevented. In particular, plural movable portions are formed, with said optical absorptive film formed in the regions below the gaps between the adjacent movable portions, so that leaking light from gaps can be prevented effectively. In addition, by also forming said optical absorptive film on holes formed on the surface of the movable portions, leaking light and scattered light from said holes can be reduced or prevented. Consequently, when movable portions form the optical element for image display, it is possible to improve the contrast ratio significantly.

The optical absorptive film in this invention is preferably made of an electrical insulator. In this case, even when plural electroconductive members are all covered with the film, there is still no electrical short circuit, and the film can be coated in a stable way. Also, when contact is made with the movable portions, the film should have an appropriate hardness so that it does not stick.

The optical absorptive film in this invention is preferably a fluorine-containing resin film having carbon black dispersed in it. More preferably, the film is a coating composition having necessary ingredients including fluorine-containing polymer (A) that has functional groups and a fluorine-containing resin cyclic structure in its principal chain, carbon black (B) with an average particle size smaller than 0.1 $\mu$m, oligomer-type fluorine-containing surfactant (C), aprotic fluorine-containing solvent (D), and fluorine-containing alcohol (E). It is a fluorine-containing resin film with a composition with the following features: the proportion of carbon black (B) with respect to the sum of fluorine-containing polymer (A) and carbon black (B) is 1–30 mass %; the proportion of oligomer-type fluorine-containing surfactant (C) with respect to carbon black (B) is 1–20 mass %; and the proportion of fluorine-containing alcohol (E) with respect to the total mass of aprotic fluorine-containing solvent (D) and fluorine-containing alcohol (E) is in the range of 10–20 mass %.

When said composition is used, it is possible to form a black fluorine-containing resin coating with carbon black dispersed as primary particles with a size on the order of nm. The fluorine-containing resin formed from said composition exhibits good electrical insulation, low water absorptivity, and low refractive index based on the characteristics of the fluorine-containing resin, and it is possible to form a black coating film with very high optical reliability.

REFERENCE NUMERALS AND SYMBOLS AS SHOWN IN THE DRAWINGS

In the figures, 10 represents a silicon substrate, 12 a SRAM (address circuit), 14 insulating film, 16 an optical modulating element 18 a bias bus, 20, 22 a yoke address electrode 24 a torsional hinge, 26, 28 a hinge supporting portion, 30 a yoke, 32, 34 a mirror address electrode, 36 a mirror, 40 an optical absorptive film, 42, 44 an organic polymer (spacer).

DESCRIPTION OF THE EMBODIMENTS

In the following, an appropriate embodiment of this invention will be explained with reference to the appended figures.

Figure 1:
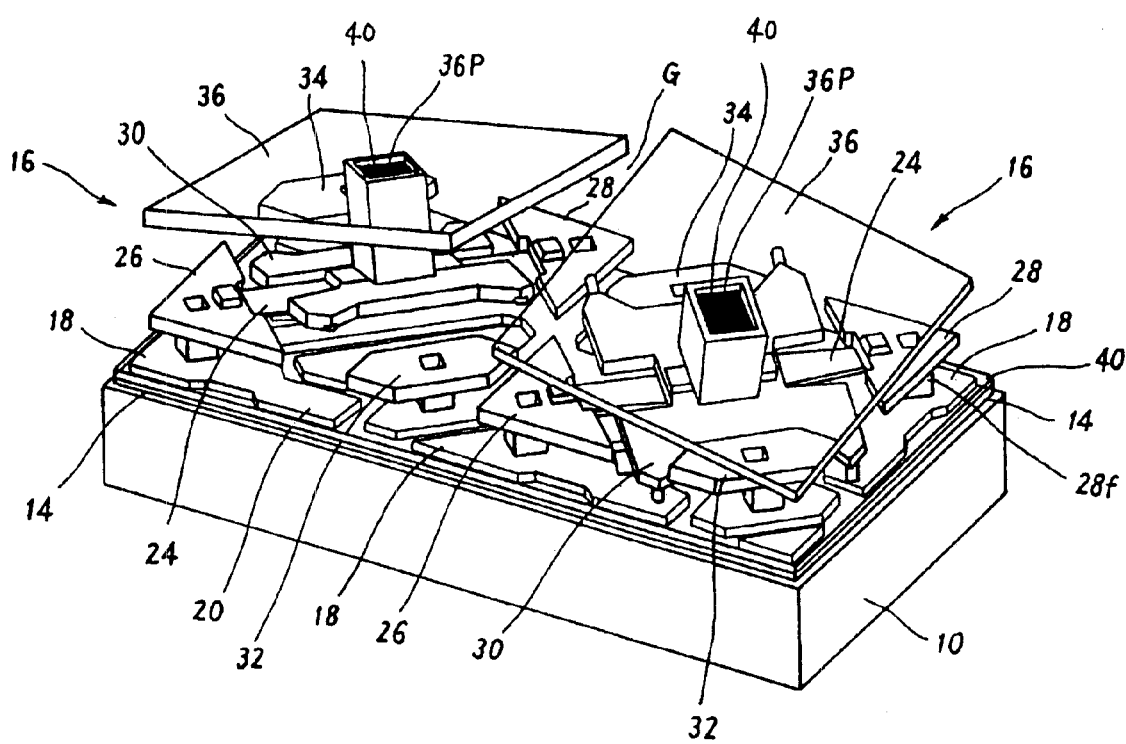
FIG. 1 is an oblique view illustrating the constitution of the main portion of a DMD in an embodiment of this invention.
Figure 2:
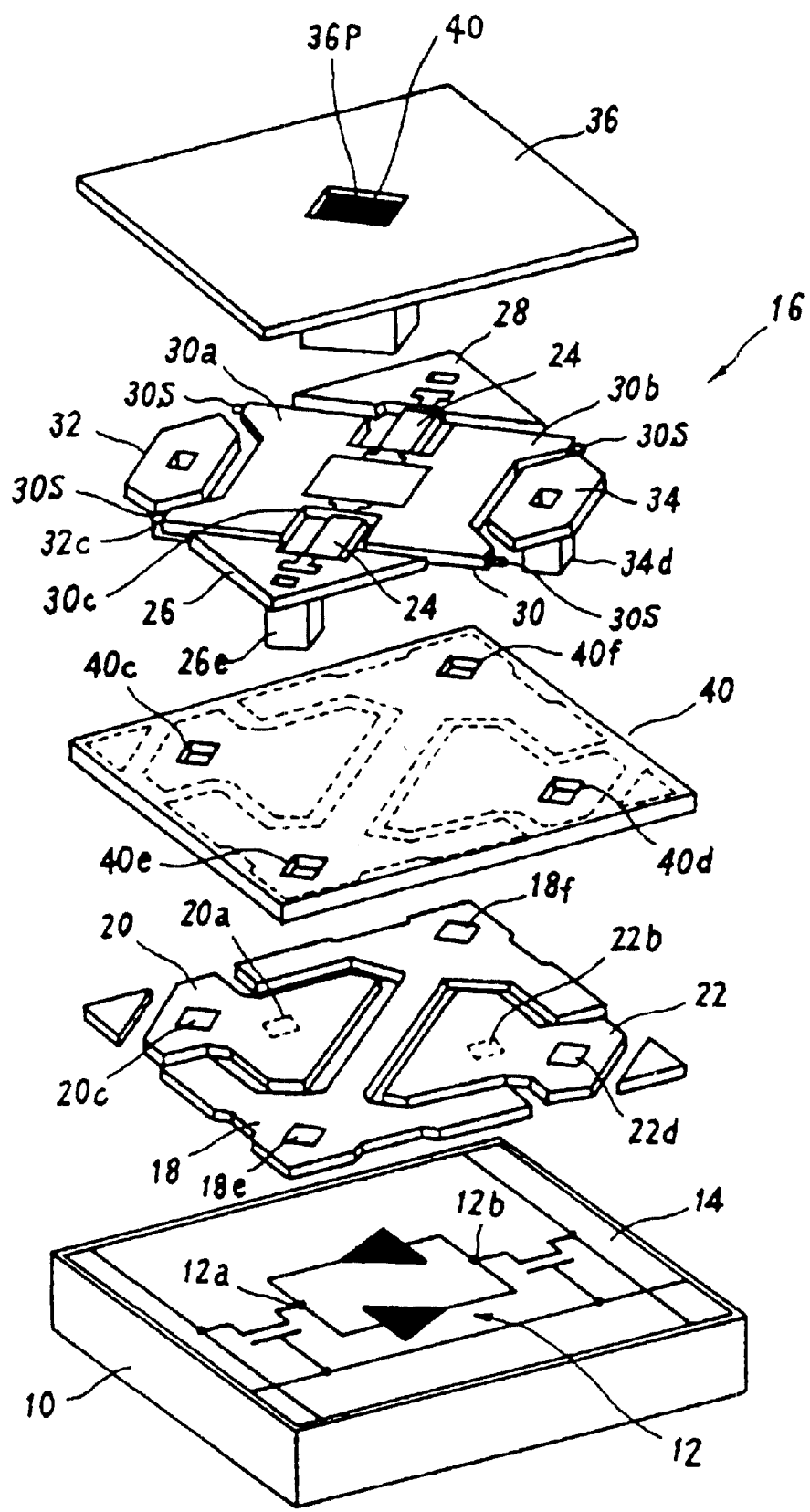
FIG. 2 is an exploded oblique view illustrating the constitution of the main portion of the DMD in the embodiment.

FIGS. 1 and 2 illustrate the constitution of the main portion of a DMD in an embodiment of this invention.

In this DMD, on the principal surface of silicon substrate 10, SRAM (Static Random Access Memory) 12 made of a CMOS (Complementary Metal Oxide Semiconductor) is formed monolithically as the address circuit of 1 cell portion, and, at the same time, reflective digital optical switch or optical modulating element 16 of 1 cell portion is formed monolithically from three layers of a metal, such as aluminum, on said SRAM 12 via oxide film 14.

More specifically, each reflective type optical modulating element 16 has one bias bus 18 and a pair (left/right) of yoke address electrodes 20, 22 as the metal members on the first layer (the lowermost layer) on oxide film 14, torsional hinge 24, a pair (front/rear) of hinge supporting portions 26, 28, one yoke 30, and a pair (left/right) of mirror address electrodes 32, 34 as the metal members of the second layer (middle layer), and one mirror 36 as the metal member of the third layer (the uppermost layer).

For the first metal layer, left/right yoke address electrodes 20 and 22 are split from bias bus 18 and are set linear symmetrically on the left/right sides, respectively. Via contact portions 120a and 22b formed at prescribed sites of said two yoke address electrodes 20 and 22 are electrically connected to complementary output terminals 12a and 12b of SRAM 12 that are respectively located right beneath them through contact holes (not shown in the figure) of oxide film 14.

For the second metal layer, torsional hinge 24 is supported between two hinge supporting portions 26 and 28. Yoke 30 has central portion 30c fixed on torsional hinge 24 and left/right rotating see-saw plate portions 30a and 30b set facing two yoke address electrodes 20 and 22, respectively. Two mirror address electrodes 32 and 34 are positioned outside the two rotating see-saw plate portions 30a and 30b, respectively, and they are set facing the left/right end portions of mirror 36 on the third metal layer, respectively.

Square column shaped post portions 26e, 28f, 32c and 34d that extend vertically downward from hinge supporting portions 26, 28 and mirror address electrodes 32, 34 on the second metal layer are connected to the various portions of the first metal layer located immediately below them, that is, contact portions 18e, 18f of bias bus 18, and contact portions 20c, 22d of yoke address electrodes 20, 22, respectively. By means of said connection between the corresponding portions of the first and second metal layers, bias bus 18 of the first metal layer and torsional hinge 24, hinge supporting portions 26, 28 and yoke 30 of the second metal layer as well as mirror 36 of the third metal layer have the same potential, and yoke address electrodes 20, 22 of the first metal layer and mirror address electrodes 32, 34 of the second metal layer have the same potential.

For each cell, when data "1" (or "0") is written into SRAM 12 of the address circuit, voltages on complementary logic levels are sent from two output terminals 12a and 12b of SRAM 12 to yoke address electrode and mirror address electrodes 20, 32, 22, 34, respectively.

As a result, corresponding to the value of the data, an electrostatic attractive force is generated between left yoke address electrode 20 and left rotating see-saw plate portion 30a of yoke 30 and between recovery mirror address electrode 32 on the left side and the left end portion of mirror 36, or between right yoke address electrode 22 and right rotating see-saw plate portion 30b of yoke 30 and between recovery mirror address electrode 34 on the right side and the right end portion of mirror 36. Due to this electrostatic torque, hinge 24 turns left or right, and yoke 30 and mirror 36 tilt to the left side or right side as an integrated body. In this case, yoke 30 and mirror 36 rotate until spring chips 30s that are attached as a pair on the two end portions of yoke 30 touch ground. As a result, the rotating angle or inclination angle of the mirror takes one of two values (such as −10° to the left and +10° to the right from the horizontal position).

When said DMD is used in a digital display, such as a digital light projection system, the light from a light source (not shown in the figure) is incident on the principal surface of the DMD at an incident angle of, say, 20°. For the various cells of the DMD, when mirror 36 is inclined by +10° to the right side, the light from the light source is reflected to the side of the projection lens (not shown in the figure) on the front, and the corresponding pixel position on the screen is lit by the projection light. On the other hand, when mirror 36 is inclined by −10° to the left side, the light from the light source is reflected by an angle of −40° with respect to the front side. Consequently, the light goes outside the projection lens, and the corresponding pixel position on the screen is dark. In this way, based on the ON/OFF operation of mirror 36, the brightness of each pixel can have a gradation. For this purpose, for example, pulse width modulation (PWM) technology may be adopted.

For the DMD in this embodiment, optical absorptive and nonconductive film 40 is formed such that it covers a portion or all (all in the example shown in FIG. 2) of the first metal layer and underlying layer (insulating film) 14. In addition, film 40 is also formed on passage 36p of mirror 36 on the third metal layer. When yoke address electrodes 20, 22 or bias bus 18 is covered with said film 40, contact holes 40c, 40d, 40e, 40f are formed at the various post portions through the corresponding sites of film 40 so that connection can be made for post portions 32c, 34d of mirror address electrodes 32, 34 of the second metal layer to contact portions 20c, 22d of yoke address electrodes 20, 22, or connection can be made for post portions 26e, 28f of hinge supporting portions 26, 28 to contact portions 18e, 18f of bias bus 18.

When light is incident from above said optical absorptive film 40, the energy of the light is absorbed by the film and is attenuated. Consequently, the light reflected or scattered from film 40 itself can be reduced, and it is also possible to suppress the reflected light and scattered light from the various portions of the first metal layer positioned below it.

Figure 3:
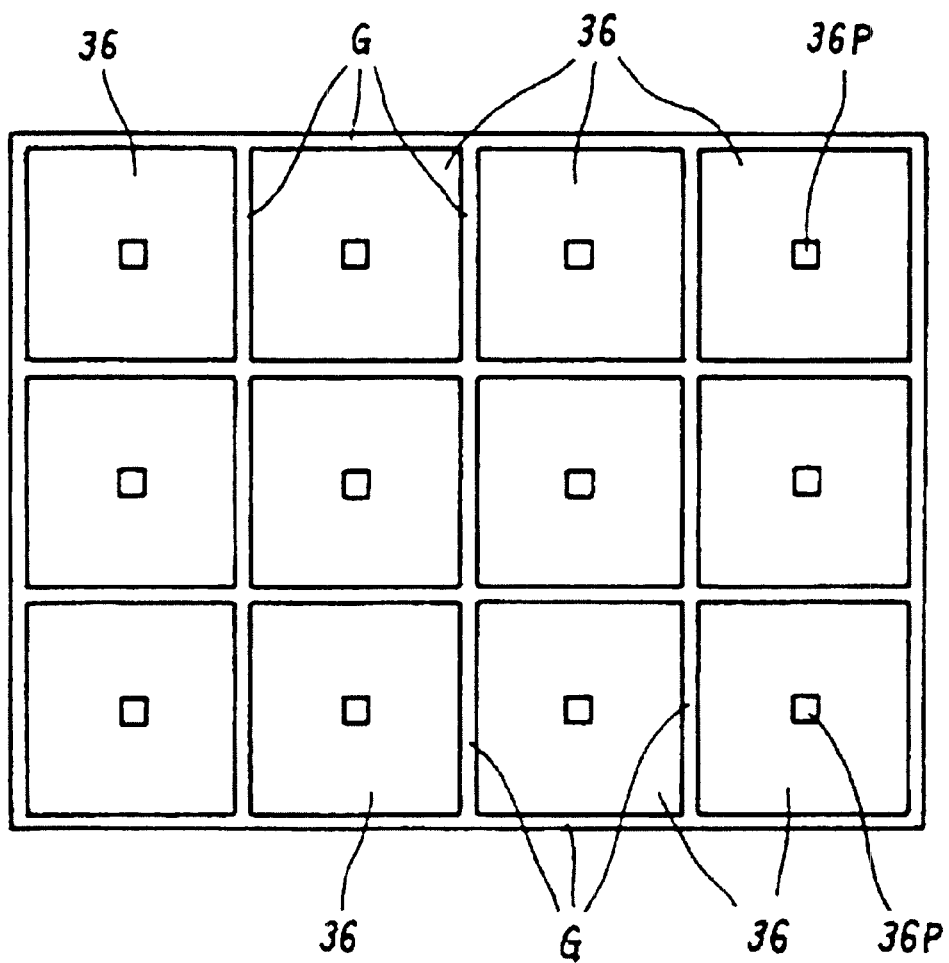
FIG. 3 is a plan view illustrating the mirror array constitution of the DMD in the embodiment.

For the mirror array of said DMD, gaps G are formed between adjacent mirrors 36, 36. For example, suppose the size of mirrors 36 is 16 μm square, and the cell pitch is 17 μm, as shown in FIG. 3, gaps G become 1 μm when mirrors 36 are set in the flat (horizontal) position. As shown in FIG. 1, when mirrors 36 are inclined left/right, gap G on the periphery of the mirror becomes larger than that in the flat state.

Light inevitably enters mirror gaps G. However, for the DMD in this embodiment, light that enters mirror gaps G is incident on film 40 coated on first metal layer and underlying film (insulating film 14), and it is absorbed at high efficiency. As a result, there is little light that can leak out (upward) from mirror gap G. Consequently, the leaking light from the OFF pixels can be reduced significantly, so that the full ON/full OFF contrast ratio can be increased significantly. There is no problem in reaching a contrast ratio of 1000:1 similar to that of a CRT. It is possible to realize a contrast ratio of about 2000:1.

Also, in this embodiment, since optical absorptive film 40 is an electrical insulator, there is no danger of an electric short circuit between the various portions of the first and second metal layers, in particular, between yoke address electrodes 20, 22 and bias bus 18. Also, since film 40 has an appropriate hardness and a low surface energy, even when spring chips 30s of yoke 30 touch film 40 or ground, they can be separated easily without sticking.

Also, as shown in FIG. 3, the light that enters passage 36p of mirror 36 of the third metal layer is reflected, scattered and diffracted back (reflected back) from the side surface and bottom surface in passage 36p. As a result, it becomes leaking light from OFF pixel cells. However, for the DMD in this embodiment, the light that enters passage 36p is mostly absorbed by film 40, so that the influence of the leaking light from passage 36p can be reduced significantly.

The preferable material for film 40 is a fluorine-containing resin film with carbon black dispersed in it. More specifically, it is a coating composition having necessary ingredients including fluorine-containing polymer (A) that has functional groups and a fluorine-containing resin cyclic structure in its principal chain, carbon black (B) with an average particle size smaller than 0.1 μm, oligomer-type fluorine-containing surfactant (C), aprotic fluorine-containing solvent (D), and fluorine-containing alcohol (E). It is a fluorine-containing resin film made of composition (F) with the following features: the proportion of carbon black (B) with respect to the sum of fluorine-containing polymer (A) and carbon black (B) is 1–30 mass %; the proportion of oligomer-type fluorine-containing surfactant (C) with respect to carbon black (B) is 1–20 mass %; and the proportion of fluorine-containing alcohol (E) with respect to the total mass of aprotic fluorine-containing solvent (D) and fluorine-containing alcohol (E) is in the range of 10–20 mass %.

Said composition (F) can be manufactured by mixing a dispersion prepared by ultrasonic processing of a mixture of carbon black (B), fluorine-containing alcohol (E) and oligomer-type fluorine-containing surfactant (C), and a solution prepared by dissolving fluorine-containing polymer (A) in aprotic fluorine-containing solvent (D).

The number of functional groups in fluorine-containing polymer (A) is preferably in the range of 0.001–1 mmol with respect to 1 g of fluorine-containing polymer (A). This fluorine-containing polymer (A) is preferred.

For fluorine-containing alcohol (E), fluorine-containing alcohol (E) containing 65 mass % or more of fluorine atoms in the molecule is preferred.

For oligomer-type fluorine-containing surfactant (C), an oligomer having long-chain polyfluoroalkyl groups and hydrophilic groups and having an average molecular weight of 2000 or larger is preferred.

Fluorine-containing polymer (A) in said composition (F) is a fluorine-containing polymer having an aliphatic cyclic structure in the principal chain, and the polymer also has functional groups.

The polymer "having aliphatic cyclic structure in the principal chain" refers to a polymer with its principal chain consisting carbon atoms. One or several of the carbon atoms that form a ring of the aliphatic cyclic structure are carbon atoms that form its principal chain. The carbon atoms of the principal chain come from the two carbon atoms of polymerizable double bonds of the monomer. For a polymer formed by cyclic polymerization of a monomer having two polymerizable double bonds to be explained later, the carbon atoms usually come from the four carbon atoms of the two polymerizable double bonds. In addition to carbon atoms, atoms that form the aliphatic cyclic ring also include oxygen atoms, nitrogen atoms, etc. A preferable aliphatic cyclic ring is an aliphatic ring having 1–2 oxygen atoms. The number of atoms that form the aliphatic ring should be in the range of 4–10, or preferably in the range of 4–7. "Fluorine-containing" aliphatic ring refers to an aliphatic ring with fluorine-containing substituents (such as polyfluoroalkyl groups) and fluorine atoms bonded to the carbon atoms that form the ring. Also, the carbon atoms of the principal chain of the polymer may contain carbon atoms that usually do not form a ring.

The fluorine-containing polymer having aliphatic cyclic structure in the principal chain (hereinafter referred to as "polymer containing fluorine based cyclic structure") in said composition (F) refers to a homopolymer or copolymer of monomers selected from monomers that have polymerizable double bonds between carbon atoms that form the aliphatic ring and monomers that have polymerizable double bonds between carbon atoms that form the aliphatic ring and carbon atoms outside the aliphatic ring (these two types of monomers will hereinafter be referred to as "cyclic monomers"), or homopolymer or copolymer obtained by cyclic polymerization of monomers having two polymerizable double bonds (hereinafter referred to as "diene-based monomers"). Examples of copolymers include copolymers of cyclic monomers and other monomers, copolymers of diene-based monomers and other monomers, and copolymers of cyclic monomers and diene-based monomers.

These cyclic monomers and diene-based monomers are monomers having fluorine atoms. Highly fluorinated monomers are preferred. "Highly fluorinated" means that the proportion of the number of fluorine atoms bonded to carbon atoms with respect to the total number of hydrogen atoms and fluorine atoms bonded to carbon atoms is 80% or larger. A perfluoro monomer (with proportion of fluorine atoms of 100%) is more preferred. Also, it is possible to use perhalopolyfluoro monomers with 1–4 fluorine atoms (but less than ½ the total fluorine atom number) substituted with chlorine. As other monomers that can be copolymerized to them, perfluoro monomers and perhalopolyfluoro monomers are preferred.

In said composition (F), fluorine-containing polymer (A) is a polymer having a fluorine-based cyclic structure and having functional groups. Introduction of functional groups can be carried out by means of polymerization of cyclic monomers containing functional groups and diene-based monomers containing functional groups. Usually, it is preferred for copolymerization to be carried out for cyclic monomers and diene-based monomers along with monomers containing functional groups and of types other than the cyclic monomers and diene-based monomers. Polymers that use polymer terminals derived from a polymerization initiator, chain transfer agent, etc., as functional groups are more preferred. Fluorine-containing polymer (A) of said composition (F) and its manufacturing method are well known. For example, such are described in Japanese Kokai Patent Application Nos. Hei 4[1992]-189,880, Hei 4[1992]-226,177, Hei 11[1999]279,504, etc.

A typical example of a cyclic monomer is perfluoro(2,2-dimethyl-1,3-dioxol). When this monomer is polymerized alone or together with tetrafluoroethylene, chlorotrifluoroethylene, perfluoro(methylvinyl ether) or other radical polymerizable monomers, it is possible to obtain a polymer with a fluorine-based cyclic structure (see: Japanese Kokoku Patent Application No. Sho 63[1988]-018, 964).

Typical examples of a diene-based monomer include perfluoro(allylvinyl ether) and perfluoro(butenylvinyl ether). When these monomers are polymerized alone or together with tetrafluoroethylene, chlorotrifluoroethylene, perfluoro(methylvinyl ether) or other radical polymerizable monomers, it is possible to obtain a polymer with a fluorine-based cyclic structure (see: Japanese Kokai Patent Application Nos. Sho 63[1988]-238,111 and Sho 63[1988]-238, 115).

Preferable examples of diene-based monomers include monomers represented by $CF_2=CF-Q-CF=CF_2$, etc. Here, Q represents a C10 or lower perfluoroalkylene group that may have etheric oxygen atoms. The etheric oxygen atoms may be present on one or both terminals of the perfluoroalkylene group, or between carbon atoms. For perfluoroalkylene groups without etheric oxygen atoms, C2–6 groups are more preferred. For perfluoroalkylene groups having etheric oxygen atom on one terminal or between carbon atoms, C1–4 groups are more preferred. For perfluoroalkylene groups having etheric oxygen atoms at both terminals, C1–3 groups are more preferred.

By means of cyclic polymerization of $CF_2=CF-Q-CF=CF_2$, a polymer having cyclic monomer units is formed. For a polymer formed by said cyclic polymerization of a diene-based monomer, the carbon atoms of the principal chain are derived from the four carbon atoms with two polymerizable double bonds.

For copolymers of diene-based monomers, copolymers formed with cyclic monomers are preferred, such as copolymers formed from perfluoro(allylvinyl ether) or perfluoro(butenylvinyl ether) with perfluoro(2,2-dimethyl-1,3-dioxol).

The proportion of monomer units having an aliphatic cyclic structure with respect to all the monomer units of a polymer having a fluorine-based cyclic structure should be 20 mol % or more, or preferably 40 mol % or more. Monomer units having an aliphatic cyclic structure refer to units formed by polymerization of cyclic monomers and units formed by cyclic polymerization of diene-based monomers.

Fluorine-containing polymer (A), from the viewpoint of improvement of the dye dispersed in the polymer with respect to humidity resistance reliability and chemical resistance, is preferably a polymer substantially free of hydrogen atoms bonded to carbon atoms, except for functional group portions (that is, side chain portions having functional groups and terminal portions having functional groups). In particular, it is more preferably a perfluoro polymer, except for functional group portions.

Examples of functional groups of fluorine-containing polymer (A) include a carboxylate group, sulfonate group, groups having ester bonds, alkenyl group, hydroxyl group, maleimido group, amino group, cyano group, isocyanate group, etc. From the viewpoint of good adhesion on a silicon substrate or another substrate and good stability in storage, the carboxylate group is particularly preferred as a functional group.

From the viewpoint of guaranteeing adhesion on the substrate, the number of functional groups in fluorine-containing polymer (A) in 1 g of fluorine-containing polymer (A) should be in the range of 0.001–1 mmol. If the number is less than 0.001 mmol, adhesion on the substrate is insufficient. On the other hand, if the number is over 1 mmol, solubility in the solvent is poor, and dispersion is adversely affected. The number of functional groups with respect to 1 g of fluorine-containing polymer (A) is preferably in the range of 0.01–0.2 mmol.

Several methods may be adopted to form fluorine-containing polymer (A) with functional groups introduced into a polymer having a fluorine-based cyclic structure, such as the method in which functional groups are introduced into the polymer after manufacturing of the polymer having a fluorine-based cyclic structure; the method in which during polymerization of a monomer that can form the polymer having a fluorine-based cyclic structure, copolymerization is performed with monomers that have functional groups and that can be copolymerized with said monomer; etc. After manufacturing of the polymer having a fluorine-based cyclic structure and, in place of functional groups, containing groups that can be converted to functional groups (hereinafter referred to as "precursory functional groups"), the precursory functional groups are converted into functional groups so as to manufacture the desired polymer-containing functional groups. For example, alkoxycarbonyl groups may be used as precursory functional groups. The alkoxycarbonyl groups can be converted to carboxylate groups by means of hydrolysis. As a specific method, for example, the method described in said Japanese Kokai Patent Application No. Hei 11[1999]-279,504 may be adopted.

In said composition (F), for carbon black (B), the average particle size should be 0.1 μm or smaller, or preferably in the range of 0.02–0.08 μm. When the average particle size is larger than 0.1 μm, the dispersion stability becomes insufficient. There is no special limitation on the type and manufacturing method of the carbon black. Also, for the carbon black, there is no need to perform any special treatment. However, it is possible to perform a treatment beforehand with a fluorine-containing silane coupling agent or another surface treatment agent described in Japanese Kokai Patent Application No. Hei 7[1995]-112,126.

In said composition (F), oligomer-type fluorine-containing surfactant (C) is an oligomer that has a long-chain polyfluoro-hydrocarbon group, which is a highly hydrophobic group, and groups which are relatively more hydrophilic with respect to said hydrophobic group. As the long-chain polyfluoro-hydrocarbon group, C4–2 [sic; (4–20)] long-chain polyfluoro-alkyl groups are preferred. As groups that are relatively hydrophilic, polyoxyethylene groups are preferred. The desired oligomer can be manufactured by copolymerization of a monomer having a long-chain polyfluoro-hydrocarbon group and a monomer having a polyoxyethylene group. For the oligomer-type fluorine-containing surfactant (C), the average molecular weight should be 2000 or larger, or preferably in the range of 5000–100,000. If the molecular weight is smaller than 2000, the dispersion property of carbon black is insufficient. On the other hand, if the molecular weight is too large, the solubility in solvent is insufficient.

As the monomer having a long-chain polyfluoro-hydrocarbon group, the monomer represented by following formula (1) is preferred. As the monomer having a polyoxyethylene group, the monomer represented by following formula (2) is preferred.

$$CH_2=C(R)COOCH_2CH_2R^f \quad (1)$$

$$CH_2=C(R)COO(CH_2CH_2O)_nR \quad (2)$$

In formulas (1) and (2), R represents a hydrogen atom or methyl group; $R^f$ represents C4–20 straight-chain perfluoro-alkyl group; n is an integer of 1–8; and [the second] R represents a hydrogen atom, alkyl group, or acyl group.

Oligomer-type fluorine-containing surfactant (C) may also be a copolymer formed by copolymerization of said two types of monomers together with one or several types of other copolymeric monomers. Examples of other monomers include acrylate, methacrylate, styrene, and other hydrocarbon based monomers other than the aforementioned two types of monomers. The proportion of the other monomers with respect to all the monomers should be 80 mass % or less, or preferably 50 mass % or less.

The desired oligomer can be obtained by radical polymerization of said monomers. By performing polymerization in the presence of an appropriate initiator and chain transfer agent, it is possible to form an oligomer having the desired molecular weight.

The amount of oligomer-type fluorine-containing surfactant (C) in said composition (F) is not specifically limited, as long as the amount is effective in displaying dispersion stability. In order to realize even higher dispersion stability, the amount with respect to carbon black (B) is preferably in the range of 1–20 mass %, or more preferably in the range of 5–15 mass %. The presence of excessive oligomer-type fluorine-containing surfactant (C) may cause coagulation of carbon black.

The proportion of the total mass of carbon black (B) with respect to the total mass of fluorine-containing polymer (A) and carbon black (B), that is, mass proportion (B)/{(A)+(B)}, should be in the range of 1–30 mass %, or preferably in the range of 5–20 mass %. If the proportion is too small, the characteristics of carbon black cannot be fully displayed. On the other hand, if the proportion is too large, the acid-dividing property [sic; the dispersion property] degrades, and the mechanical strength of the resin film formed from said composition (F) decreases.

Said composition (F) must contain the following two types of solvents: aprotic fluorine-containing solvent (D) and fluorine-containing alcohol (E).

Aprotic fluorine-containing solvent (D) is a fluorine-containing solvent that does not dissociate to form protons under normal application conditions. Conventional well-known types may be used. Also, said composition (F) may contain two or more types of aprotic fluorine-containing solvent (D). The following is a list of specific solvents.

Perfluorodecalin, perfluorocyclohexane, perfluorohexane, perfluoro-octane, 1H,1H,1H,2H,2H-perfluoro-octane, 1H,1H,1H,2H,2H-perfluorodecane, and other fluorine-containing aliphatic hydrocarbons; perfluorotribenzylamine, perfluorotributylamine, perfluorotripropylamine, and other fluorine-containing alkylamines; perfluoro(2-butyltetrahydrofuran), and other fluorine-containing cyclic ethers; methyl perfluorobutyl ether, methyl perfluorohexyl ether, and other hydrofluoroethers.

As fluorine-containing alcohol (E), a fluorine-containing alcohol that has high fluorine content and is in liquid form at room temperature is preferred. The carbon number should be in the range of 2–20, or preferably in the range of 2–12. In particular, a primary fluorine-containing alcohol is more preferred. In addition, in order to improve the affinity between fluorine-containing polymer (A) and carbon black (B), it is preferred that the fluorine content be high. In particular, a fluorine content of 65 mass % or higher is preferred. Said composition (F) may contain two or more types of fluorine-containing alcohol (E). The following are some examples of fluorine-containing alcohol (E): $CF_3DH_2OH$, $F(CF_2)_2CH_2OH$, $F(CF_2)_4CH_2CH_2OH$, $F(CF2)_6CH_2CH_2OH$, $F(CF_2)_2CH_2CH_2CH_2OH$, $F(CF_2)_4CH_2CH_2CH_2OH$.

The proportion of fluorine-containing alcohol (E) with respect to the total mass of aprotic fluorine-containing solvent (D) and fluorine-containing alcohol (E) in said composition (F), that is, mass proportion (E)/{(D)+(E)}, is in the range of 10–20 mass %. If this proportion is less than 10 mass %, the dispersion property of the carbon black is insufficient. On the other hand, if the amount is over 20 mass %, solubility of the fluorine-containing polymer becomes insufficient, and the fluorine-containing polymer may precipitate. In addition, the proportion of fluorine-containing polymer (A) with respect to aprotic fluorine-containing solvent (D) should be smaller than the solubility of fluorine-containing polymer (A) [in the solvent], or preferably 20 mass % or less, or more preferably in the range of 0.1–16 mass %. If this proportion is too large, the viscosity of the coating composition becomes too high to be handled. Also, the coating property and film-forming property of the composition are degraded.

Said composition (F) can be obtained by mixing the various ingredients. There is no special limitation on the mixing method. In order to obtain a composition with improved dispersion stability of carbon black (B), it is preferred that carbon black (B) be fully dispersed in oligomer-type fluorine-containing surfactant (C) and solvents beforehand, followed by mixing with other ingredients. Fluorine-containing alcohol (E) is a preferable solvent for dispersing carbon black (B) beforehand. Also, a mixture solvent prepared from fluorine-containing alcohol (E) and a portion of aprotic fluorine-containing solvent (D) may be used. A method using ultrasonic waves for dispersion is preferred for fully dispersing carbon black (B) in the solvent beforehand.

When the dispersion prepared by fully dispersing carbon black (B) in oligomer-type fluorine-containing surfactant (C) and fluorine-containing alcohol (E) is mixed with a solution of fluorine-containing polymer (A) in aprotic fluorine-containing solvent (D), a very good dispersion can be obtained. When the two components are mixed, ultrasonic treatment can further improve the dispersion stability.

In the following, the method for manufacturing the DMD in this embodiment will be explained with reference to FIGS. 4–13.

Figure 4:
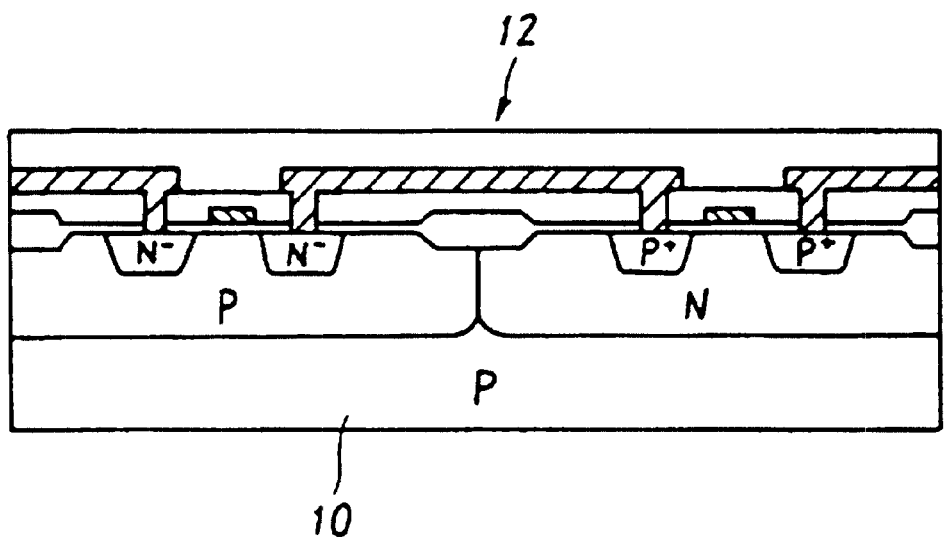
FIG. 4 is a schematic cross-sectional view of a step of operation in the manufacturing method of the DMD in the embodiment.
Figure 5:
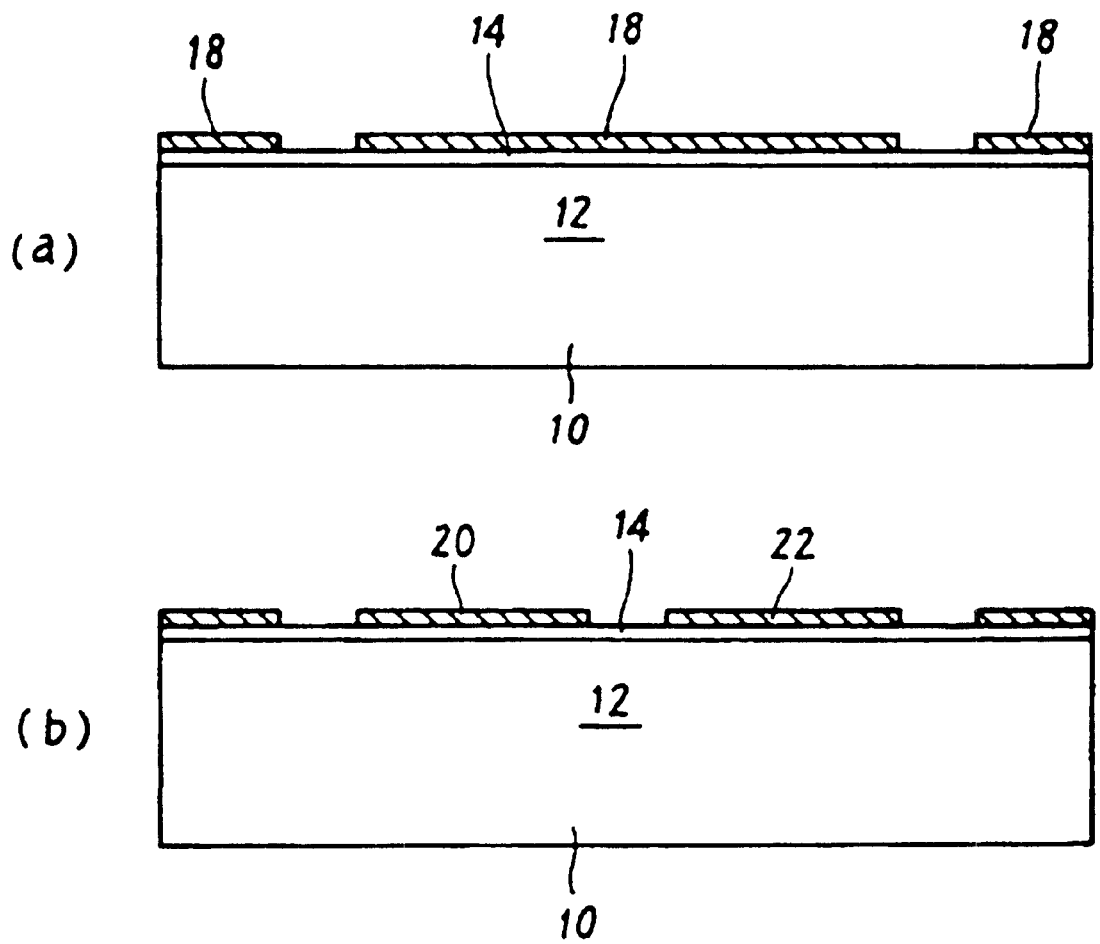
FIG. 5 is a schematic cross-sectional view of a step of operation in the manufacturing method of the DMD in the embodiment.

A portion of an integrated circuit (CMOS inverter) is shown schematically in FIG. 4. On the principal surface of silicon substrate 10, CMOS SRAM 12 is formed as the address circuit for each cell using a conventional wafer process. In FIG. 5 and thereafter, in order to facilitate illumination by figures, the device structure of SAM [sic; SRAM] 12 is omitted.

As shown in FIG. 5, thick oxide film 14 is deposited on the surface protective film of SRAM 12 by means of CMP (Chemical Mechanical Polishing). On this film, aluminum is coated using a sputtering method, followed by patterning to form the various portions of the first metal layer, that is, bias bus 18 and yoke address electrodes 20, 22. Here, although not shown in the figure, contact portions 20a, 22b of yoke address electrodes 20, 22 are connected to complementary output terminals 12a, 12b of SRAM 12 immediately below them through contact holes formed in oxide film 14.

Figure 6:
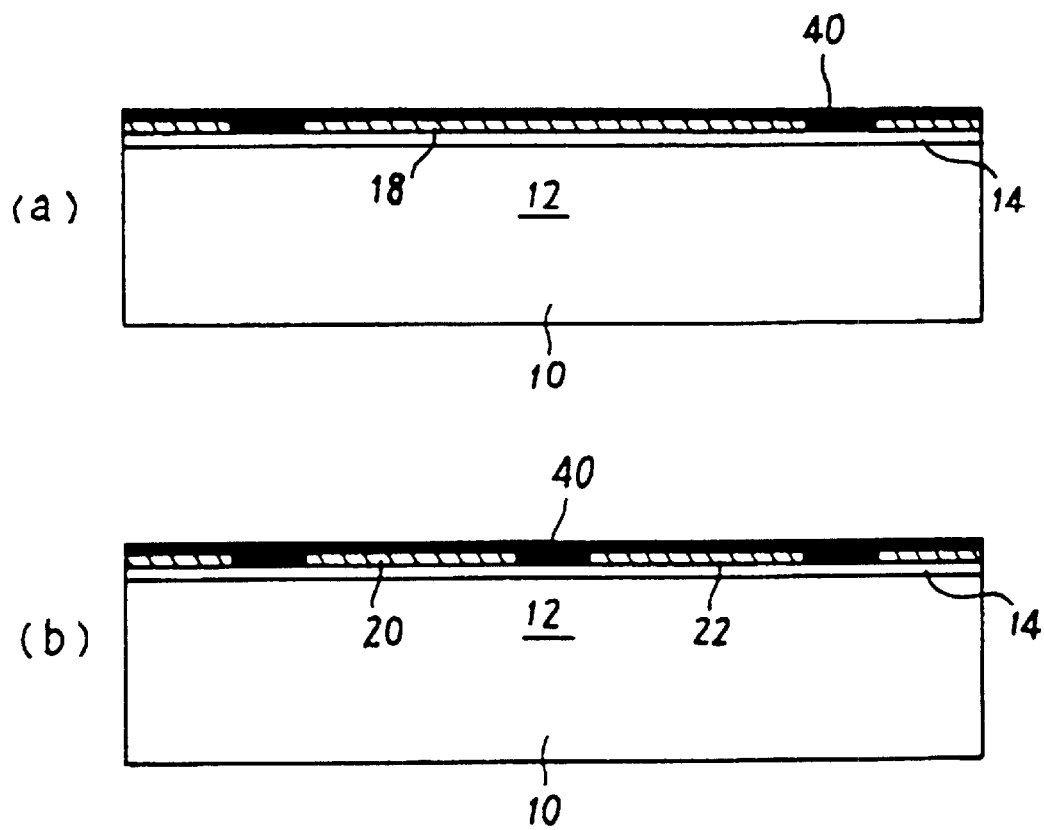
FIG. 6 is a schematic cross-sectional view of a step of operation in the manufacturing method of the DMD in the embodiment.

Then, as shown in FIG. 6, said composition (F) is coated using a spin coating method to form a film with a prescribed thickness to cover the entire surface of the various portions of the first metal layer and oxide film 14 that is exposed. Then, it is dried to remove the solvent, forming film 40.

Figure 7:
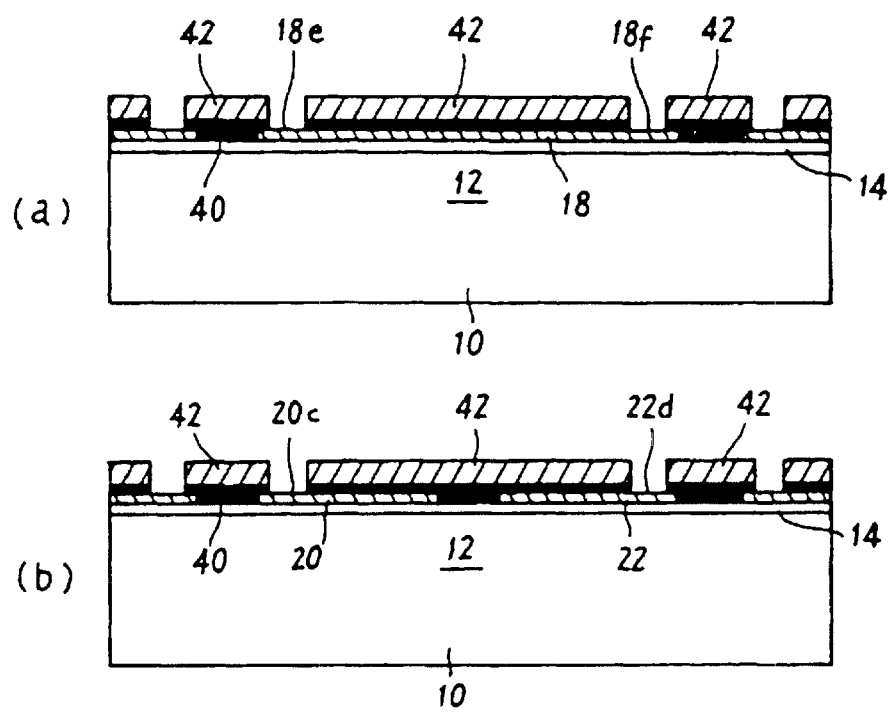
FIG. 7 is a schematic cross-sectional view of a step of operation in the manufacturing method of the DMD in the embodiment.

Then, as shown in FIG. 7, on dried film 40, organic polymer 42 is laminated as spacer, followed by patterning using a photoetching method, so that contact holes are formed at the sites of contact portions 20c, 22d, 18e, 18f of the first metal layer.

Figure 8:
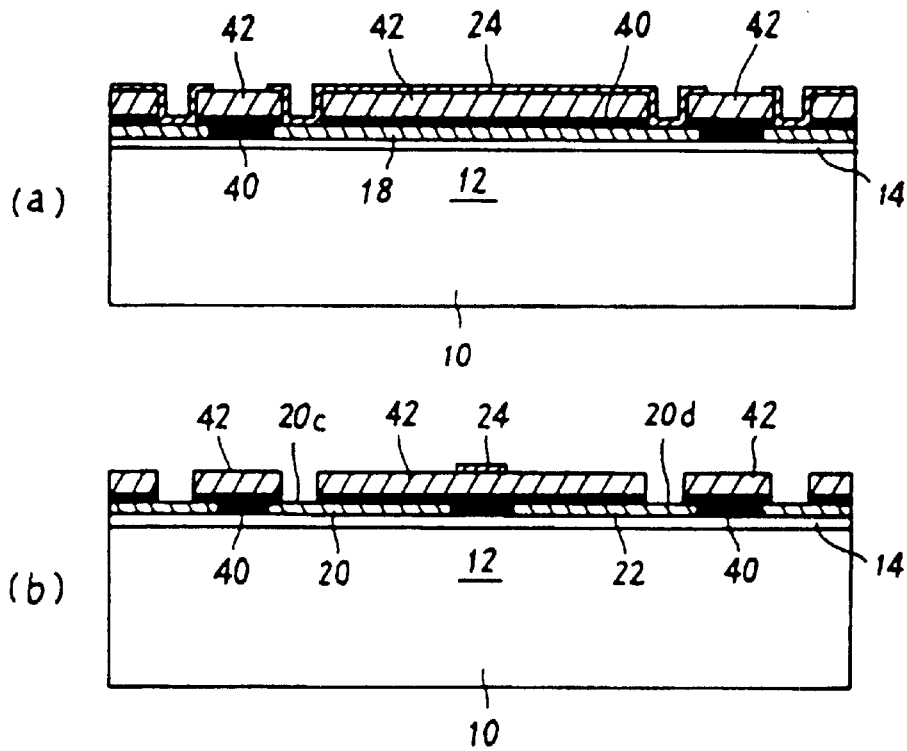
FIG. 8 is a schematic cross-sectional view of a step of operation in the manufacturing method of the DMD in the embodiment.

Then, as shown in FIG. 8, as the first step of the second metal layer, an aluminum film is formed with a small thickness on the entire surface of the substrate surface using a sputtering method, followed by patterning to form torsional hinge 24.

Figure 9:
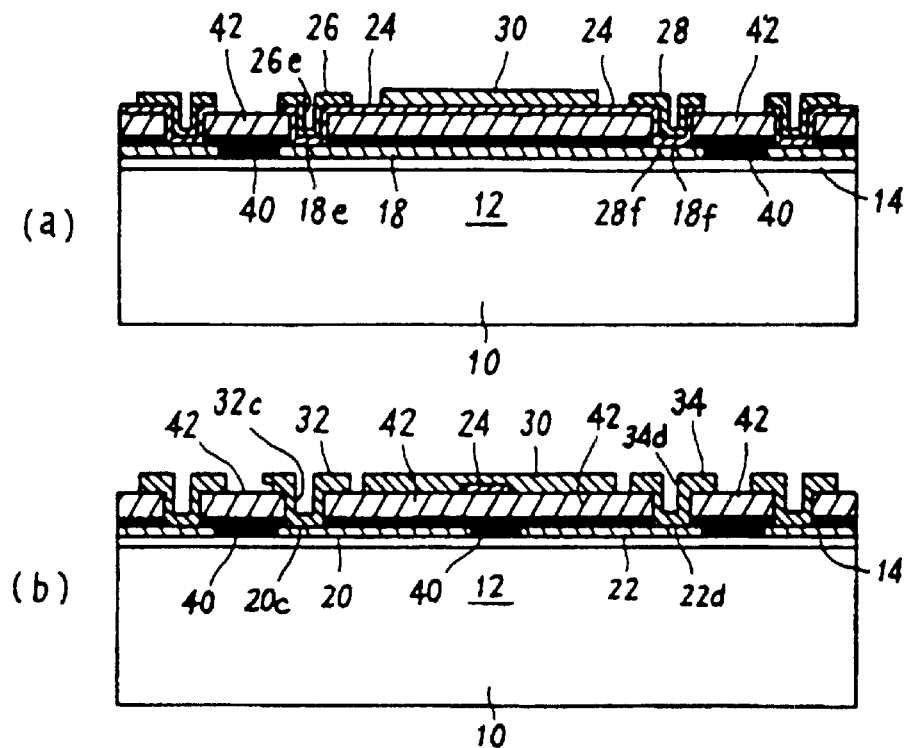
FIG. 9 is a schematic cross-sectional view of a step of operation in the manufacturing method of the DMD in the embodiment.

Then, as shown in FIG. 9, as the second step of the second metal layer, a thick aluminum film is coated on the entire surface of the substrate, followed by patterning to form hinge supporting portions 26, 28, yoke 30, and mirror address electrodes 32, 34.

Figure 10:
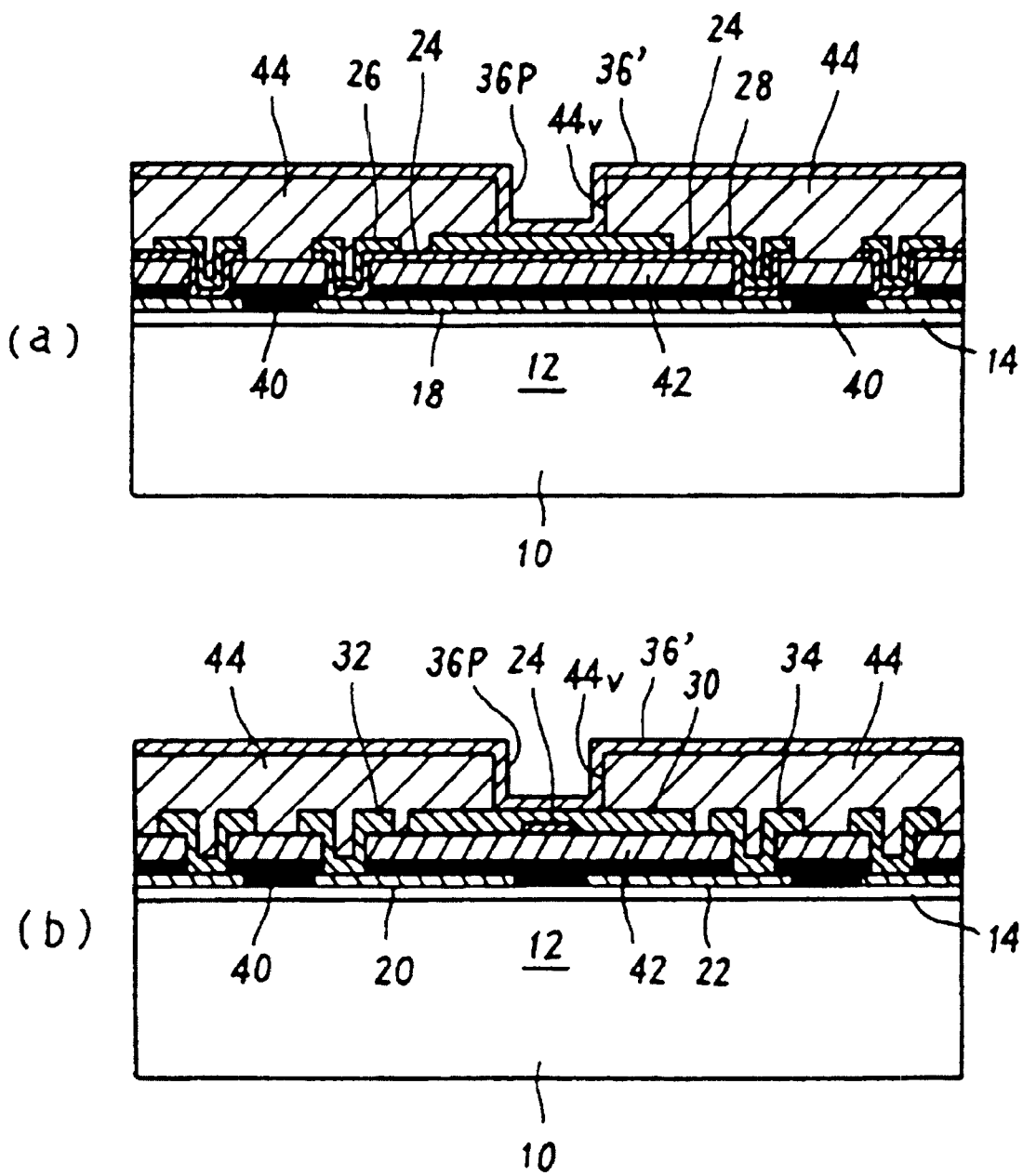
FIG. 10 is a schematic cross-sectional view of a step of operation in the manufacturing method of the DMD in the embodiment.

Then, as shown in FIG. 10, organic polymer layer (spacer) 44 is laminated on the entire surface of the substrate, and by means of photoetching, via hole 44v is formed at the central portion, followed by coating aluminum 36 as the third metal layer with a prescribed thickness on the entire surface using a sputtering method. In this case, third metal layer 36 is also coated on the inner wall of via hole 44v, and, at the same time, it is connected to yoke 30 of the second metal layer at the bottom portion of the via hole.

Figure 11:
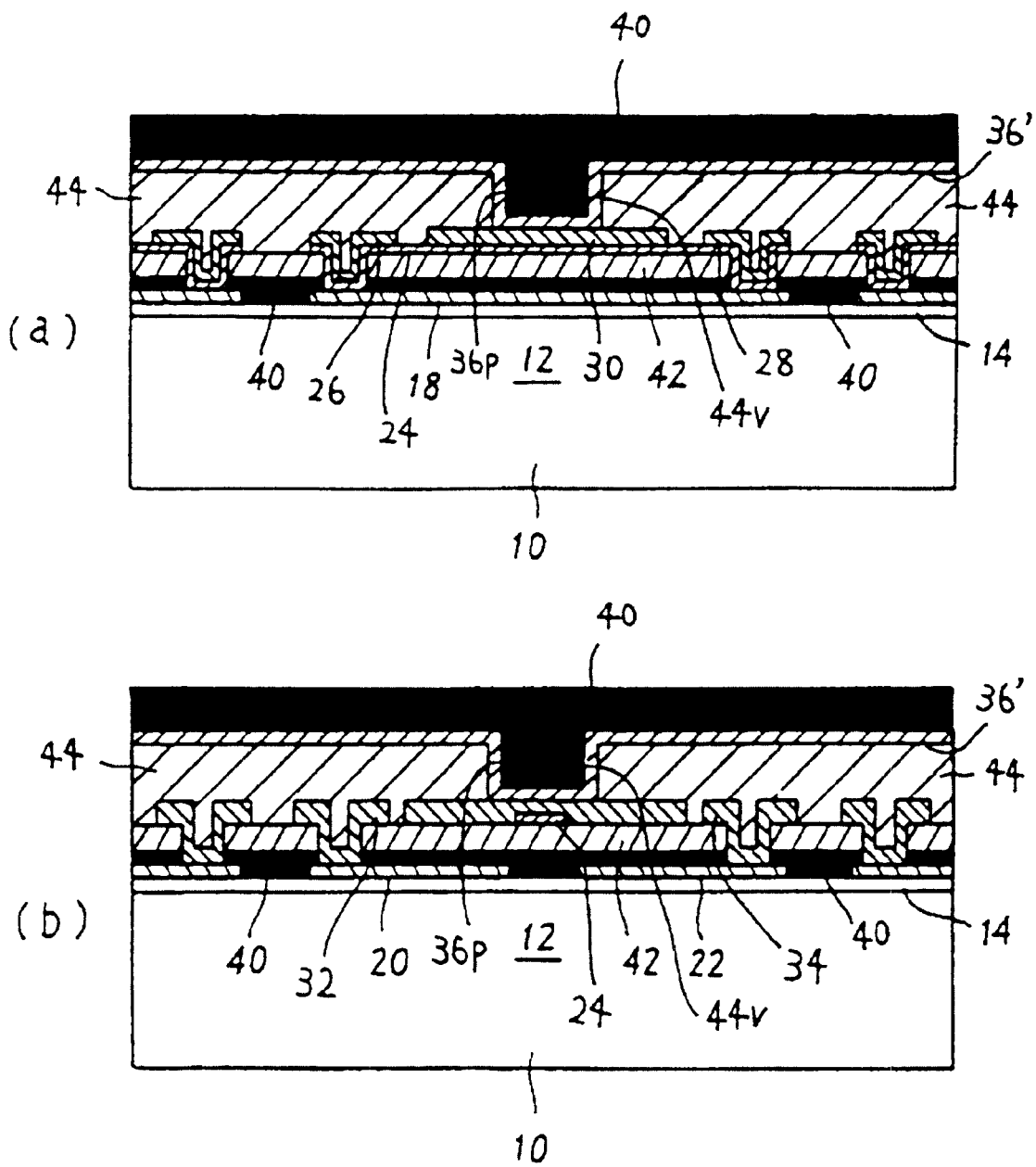
FIG. 11 is a schematic cross-sectional view of a step of operation in the manufacturing method of the DMD in the embodiment.

Then, as shown in FIG. 11, film 40 made of said composition (F) is coated with a prescribed film thickness to cover the entire surface of the third metal layer using a spin coating method, followed by drying.

Figure 12:
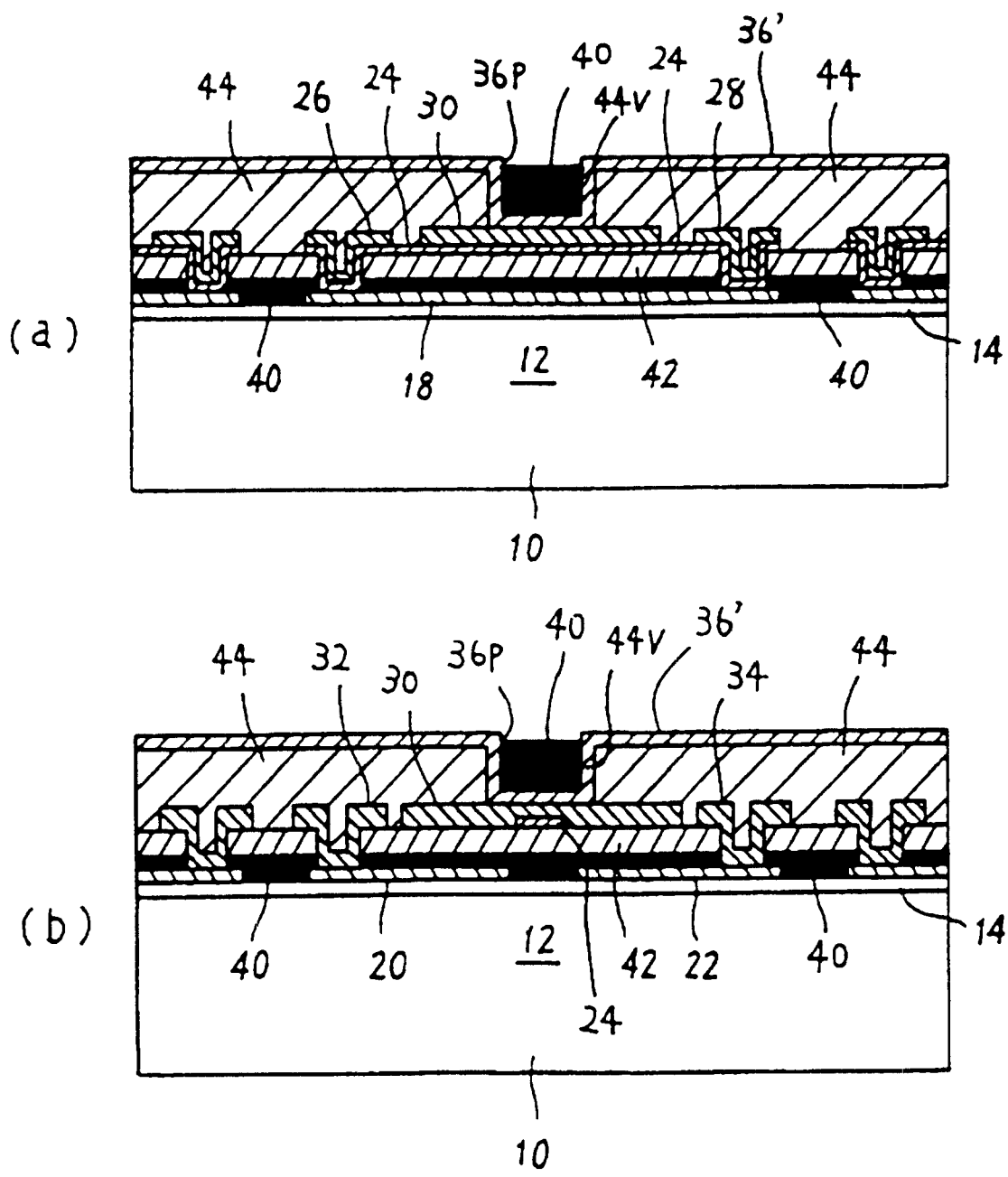
FIG. 12 is a schematic cross-sectional view of a step of operation in the manufacturing method of the DMD in the embodiment.

Then, as shown in FIG. 12, film 40 is etched back by means of anisotropic etching to reach near the opening of passage 36p of the third metal layer, with film 40 left in passage 36 of the third metal layer.

Figure 13:
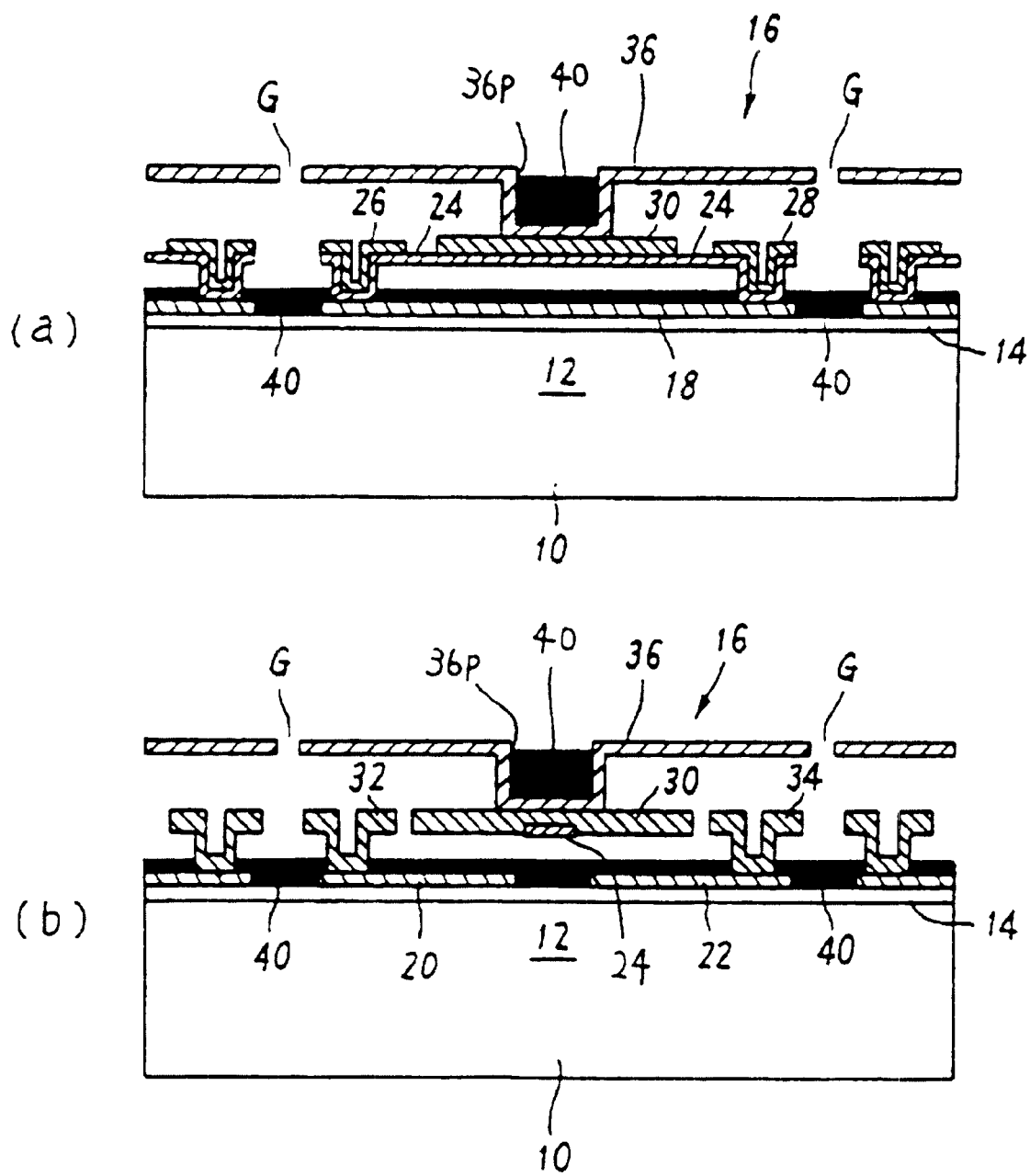
FIG. 13 is a schematic cross-sectional view of a step of operation in the manufacturing method of the DMD in the embodiment.

Then, as shown in FIG. 13, the portion that becomes gap G in the pattern shown in FIG. 3 on the third metal layer is etched off to form mirror 36 of each cell. Finally, by means of isotropic plasma etching, organic polymer layers (spacers) 42, 44 are under-cut (removed). As a result, gaps are formed between the metal layers, and yoke 30 and mirror 36 can rotate integrally as they are suspended on hinge supporting portions 26, 28 via torsional hinge 24. As a result, optical modulating element 16 is completed. Passage 36p of the third metal layer form the mirror supporting post for connecting mirror 36 to yoke 30. Also, with isotropic plasma etching of organic polymer layers 42, 44, no etching takes place for the fluorine-containing resin film with carbon black dispersed in it. This is because the fluorine chemical bonds of the fluorine-containing resin are not cut. Consequently, film 40 is left as the structural element of the micro-mirror structural body after the undercutting.

In the aforementioned embodiment, film 40 is formed on the entire surface to cover the various portions of the first metal layer. However, as needed, it is also possible to have a portion of the first metal layer exposed selectively. For example, it is also possible to adopt a constitution in which film 40 is cut to expose bias bus 18 at the site where spring pad 30s of yoke 30 touches ground. Also, it is possible to set film 40 only in the region below mirror gap G. In this constitution, too, it is possible to realize a significant effect in inhibiting reflection or scattering of light.

As another embodiment, it is possible to adopt a constitution in which film 40 is formed to cover either partially or entirely the surface of the members of the second metal layer, such as hinge supporting portions 26, 28, mirror address electrodes 32, 34, yoke 30, etc.

The constitution of the DMD of the aforementioned embodiment is an example. For example, it is also possible to adopt a constitution in which an electric circuit for driving the micromachine is formed on the substrate in a non-monolithic manner, and it is possible to adopt a micromachine structure with metal members formed as two layers or four or more layers on insulating film 14. Also, this invention can be applied on a micro-electromechanical system other than a DMD.

What is claimed is:

1. A micro-electromechanical system comprising:

a substrate;

an electrical circuit formed on said substrate;

a mechanism supported by said substrate and operable under the control of said electrical circuit;

an optical absorptive film on at least a portion of said mechanism, said optical absorptive film being a fluorine containing resin with carbon black dispersed in it.

2. The micro-electromechanical system of claim 1, said mechanism comprising:

at least one movable portion spaced apart from said substrate, said optical absorptive film being supported on said substrate around at least a perimeter of said movable portion.

3. The micro-electromechanical system of claim 1, said mechanism comprising:

at least two movable portions spaced apart from said substrate, said movable portions separated by gaps, said optical absorptive film being supported on said substrate in a region proximate said gaps.

4. The micro-electromechanical system of claim 1, said mechanism comprising:

at least one reflective movable portion having a hole in a reflective surface proximate a support member, said optical absorptive film being supported said support member.

5. The micro-electromechanical system of claim 1, said optical absorptive film comprising:

a fluorine containing polymer and a fluorine containing resin cyclic structure in its principal chain.

6. The micro-electromechanical system of claim 1, said optical absorptive film comprising: carbon black.

7. The micro-electromechanical system of claim 1, said optical absorptive film comprising:
carbon black with an average particle size smaller than 0.1 μm.

8. The micro-electromechanical system of claim 1, said optical absorptive film comprising:
oligomer-type fluorine-containing surfactant.

9. The micro-electromechanical system of claim 1, said optical absorptive film comprising:
aprotic fluorine-containing solvent.

10. The micro-electromechanical system of claim 1, said optical absorptive film comprising:
fluorine-containing alcohol.

11. The micro-electromechanical system of claim 1, said optical absorptive film comprising:
a fluorine-containing polymer; and
carbon black;
wherein the proportion of carbon black with respect to the sum of fluorine-containing polymer and carbon black is 1 to 30% by mass.

12. The micro-electromechanical system of claim 1, said optical absorptive film comprising:
an oligomer-type fluorine-containing surfactant; and
carbon black;
wherein the proportion of said carbon black with respect with respect to carbon black is 1 to 20% by mass.

13. The micro-electromechanical system of claim 1, said optical absorptive film comprising:
a fluorine containing alcohol; and
an aprotic fluorine containing solvent;
wherein the proportion of fluorine-containing alcohol with respect to the total mass of aprotic fluorine containing solvent and fluorine-containing alcohol is 10 to 20% by mass.

14. A micro-electromechanical system comprising:
a substrate;
an electrical circuit formed on said substrate;
a mechanism supported by said substrate and operable under the control of said electrical circuit;
an optical absorptive film on at least a portion of said mechanism, said optical absorptive film comprising:
a fluorine containing polymer and a fluorine containing resin cyclic structure in its principal chain;
carbon black;
oligomer-type fluorine-containing surfactant;
aprotic fluorine-containing solvent; and
fluorine-containing alcohol.

15. The micro-electromechanical system of claim 14, wherein the proportion of carbon black with respect to the sum of fluorine-containing polymer and carbon black is 1 to 30% by mass.

16. The micro-electromechanical system of claim 14, wherein the proportion of said carbon black with respect with respect to carbon black is 1 to 20% by mass.

17. The micro-electromechanical system of claim 14, wherein the proportion of fluorine-containing alcohol with respect to the total mass of aprotic fluorine containing solvent and fluorine-containing alcohol is 10 to 20% by mass.

18. The micro-electromechanical system of claim 14, said optical absorptive film comprising:
carbon black with an average particle size smaller than 0.1 μm.

19. The micro-electromechanical system of claim 14, said mechanism comprising:
at least one movable portion spaced apart from said substrate, said optical absorptive film being supported on said substrate around at least a perimeter of said movable portion.

20. The micro-electromechanical system of claim 14, said mechanism comprising:
at least two movable portions spaced apart from said substrate, said movable portions separated by gaps, said optical absorptive film being supported on said substrate in a region proximate said gaps.

21. The micro-electromechanical system of claim 14, said mechanism comprising:
at least one reflective movable portion having a hole in a reflective surface proximate a support member, said optical absorptive film being supported said support member.

* * * * *